(12) United States Patent
Kim et al.

(10) Patent No.: US 11,435,598 B2
(45) Date of Patent: Sep. 6, 2022

(54) OPTICAL SYSTEM FOR THREE-DIMENSIONAL STEREOSCOPIC IMAGE DISPLAY

(71) Applicant: Yunam Optics Inc., Bucheon-si (KR)

(72) Inventors: Young Ju Kim, Yongin-si (KR); Jin Young Park, Icheon-si (KR)

(73) Assignee: Yunam Optics Inc., Bucheon-si (KR)

( * ) Notice: Subject to any disclaimer, the term of this patent is extended or adjusted under 35 U.S.C. 154(b) by 286 days.

(21) Appl. No.: 16/956,020

(22) PCT Filed: Oct. 1, 2018

(86) PCT No.: PCT/KR2018/011623
§ 371 (c)(1),
(2) Date: Jun. 19, 2020

(87) PCT Pub. No.: WO2019/132188
PCT Pub. Date: Jul. 4, 2019

(65) Prior Publication Data
US 2021/0072557 A1    Mar. 11, 2021

(30) Foreign Application Priority Data
Dec. 26, 2017 (KR) .......................... 10-2017-0179011

(51) Int. Cl.
*G02B 30/56* (2020.01)
*G02B 1/11* (2015.01)
(Continued)

(52) U.S. Cl.
CPC ............... *G02B 30/56* (2020.01); *G02B 1/11* (2013.01); *G02B 5/04* (2013.01); *G02B 13/0095* (2013.01); *G02B 17/0844* (2013.01)

(58) Field of Classification Search
CPC .... G03B 21/006; G03B 21/008; G03B 21/28; G03B 21/145; G03B 21/208;
(Continued)

(56) References Cited

U.S. PATENT DOCUMENTS

| 2015/0103318 A1* | 4/2015 | Lee ...................... G02B 5/3083 353/8 |
| 2016/0301920 A1* | 10/2016 | Lim ...................... H04N 13/363 |
| 2017/0268927 A1* | 9/2017 | Beardsley ............ G02B 5/1842 |

FOREIGN PATENT DOCUMENTS

| JP | 11-352452 A | 12/1999 |
| JP | 2007-033581 A | 2/2007 |

(Continued)

OTHER PUBLICATIONS

PCT International Search Report dated Feb. 15, 2019 for International Application No. PCT/KR2018/011623; 4 Pages.

*Primary Examiner* — Sultan Chowdhury
(74) *Attorney, Agent, or Firm* — Daly Crowley Mofford & Durkee, LLP (57) ABSTRACT

An example optical system for a 3D stereoscopic image display comprises a changing mirror, a rotating mirror, a tilted mirror, a concave mirror and a planar mirror. The changing mirror can change the path of light from a horizontal direction to a vertical direction. The rotating mirror can rotate while having an X-axis and a Y-axis with different curvature radii. The tilted mirror can include a central region with a hole for allowing light to pass therethrough, and a peripheral region having one surface having a concave tilted structure while the other surface has a planar structure. The concave mirror can include a central region with a hole having a size capable of encompassing the tilted mirror and a peripheral region having a bent structure that is completely (Continued)

concave. The planar mirror can include a central region with a hole and a peripheral region with a flat doughnut structure.

6 Claims, 4 Drawing Sheets

(51) Int. Cl.
  *G02B 5/04* (2006.01)
  *G02B 13/00* (2006.01)
  *G02B 17/08* (2006.01)
(58) Field of Classification Search
  CPC ............ G03B 21/2053; G02B 17/0678; G02B 17/0694; G02B 17/082; G02B 17/0836; G02B 17/0844; G02B 13/0025; G02B 13/003; G02B 13/0065; G02B 13/007; G02B 13/0095; G02B 5/04; G02B 5/08; G02B 5/0808; G02B 5/0816; G02B 5/124; G02B 1/11; G02B 1/111; G02B 1/115; G02B 1/116; G02B 30/00; G02B 30/22; G02B 30/26; G02B 30/35; G02B 30/56; G02B 30/60
  See application file for complete search history.

(56) References Cited

FOREIGN PATENT DOCUMENTS

| JP | 2012-233986 A | 11/2012 |
| KR | 10-2015-0140024 A | 12/2015 |
| KR | 10-2016-0082364 A | 7/2016 |

\* cited by examiner

OPTICAL SYSTEM FOR THREE-DIMENSIONAL STEREOSCOPIC IMAGE DISPLAY

This application is a U.S. National Stage Application of International application No. PCT/KR2018/011623 filed on Oct. 1, 2018 which is based upon and claims the benefit of priority to Korean Patent Application No. 10-2017-0179011 filed on Dec. 26, 2017 in the Korean Intellectual Property Office. The disclosures of the above-listed applications are hereby incorporated by reference herein in their entirety.

BACKGROUND

1. Technical Field

The invention relates to an optical system for displaying a three dimensional image. More particularly, the invention relates to an optical system for displaying a three dimensional image which can display a digital hologram magnified using a reflection configuration in a space as the three dimensional image.

2. Description of the Related Art

As display apparatuses have been developed, the demand for optical systems capable of displaying three dimensional images with reality has been increased. Such systems for displaying three dimensional images are expected to be widely used in display apparatuses. Therefore, various techniques have been attempted to accomplish the systems capable of displaying three dimensional images.

SUMMARY

The object of the invention is to provide an optical system for displaying a three dimensional image which can display a hologram as a three dimensional image with a compact structure.

To accomplish the above-mentioned object of the invention, there is provided an optical system for displaying a three dimensional image including a changing mirror, a rotating mirror, a concave mirror and a planar mirror. The changing mirror may be configured to change a path of a light from a horizontal direction to a vertical direction after the light passes through a spatial light modulator. The rotating mirror may be configured to rotate with an X-axis and a Y-axis having different curvature radii. The tilted mirror may include a central region including a hole for allowing the light to pass therethrough, and a peripheral region including one surface having a concave tilted structure and the other surface having a planar structure. The concave mirror may include a central region including a hole having a size capable of encompassing the tilted mirror, and a peripheral region having an entirely concaved bending structure. The planar mirror may include a central region including a hole therein, and a peripheral region having a flat doughnut structure. The changing mirror, the tilted mirror, the rotating mirror and the planar mirror may be arranged such that the light of which path is changed by the changing mirror may pass through the central region of the tilted mirror, the light may direct onto the rotating mirror, the light may be reflected toward the one surface of the peripheral region of the tilted mirror, the light may be reflected toward the peripheral region of the planar mirror, the light may be reflected onto the concave mirror, and the light may pass through the central region of the planar mirror. The concave mirror may enclose the tilted mirror under the rotating mirror.

In example embodiments, the rotating mirror may include aluminum and one surface of the rotating mirror onto which the light is not incident may have a concave structure.

In example embodiments, the concave mirror may include a concave portion facing the planar mirror and having an angle of about 35 degree to about 50 degree with respect to the other surface of the tilted mirror.

In example embodiments, the optical system may additionally include a color composite prism configured to synthesize R, G and B colors with the light passing through the spatial light modulator, and a focusing lens focusing the light after the light passes through the spatial light modulator, wherein the spatial light modulator, the color composite prism and the focusing lens may be arranged in a line as well as perpendicular to a direction where the rotating mirror is arranged.

In example embodiments, the optical system may additionally include a relay lens configured to focus the light of which path is changed by the changing mirror before the light passes through the central region of the tilted mirror.

In example embodiments, the optical system may additionally include a planar window configured to cover the hole of the central region of the planar mirror wherein the planar window includes anti-reflective coatings on both surfaces thereof.

According to example embodiments of the invention, the optical system for displaying a three dimensional image may includes most of elements such as various mirrors such that the chromatic aberrations may not be generated among these elements to thereby display the three dimensional image with reality. Additionally, the optical system for displaying a three dimensional image may include the various mirrors having large sizes which cannot accomplished using lenses so that the optical system may efficiently display the magnified hologram in the desired space as the three dimensional image. Furthermore, the optical system for displaying a three dimensional image may include the rotating mirror having a diameter relatively smaller than those of other mirrors such that the damage to the rotating mirror may be effectively minimized in the operation of the optical system. Particularly, the optical system for displaying a three dimensional image may have the configuration in which the spatial light modulator, the color composite prism and the focusing lens arranged horizontally in the line so that the optical system may have a compact structure by reducing the total height of the optical system.

DETAILED DESCRIPTION OF THE EMBODIMENTS

Various embodiments will be described more fully hereinafter with reference to the accompanying drawings, in which some embodiments are shown. The invention may, however, be embodied in many different forms and should not be construed as limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (for example, rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the face through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described with reference to the accompanying drawings. In the drawings, the same reference numerals are used for the same elements and redundant explanations for the same elements will be omitted.

Figure 1:
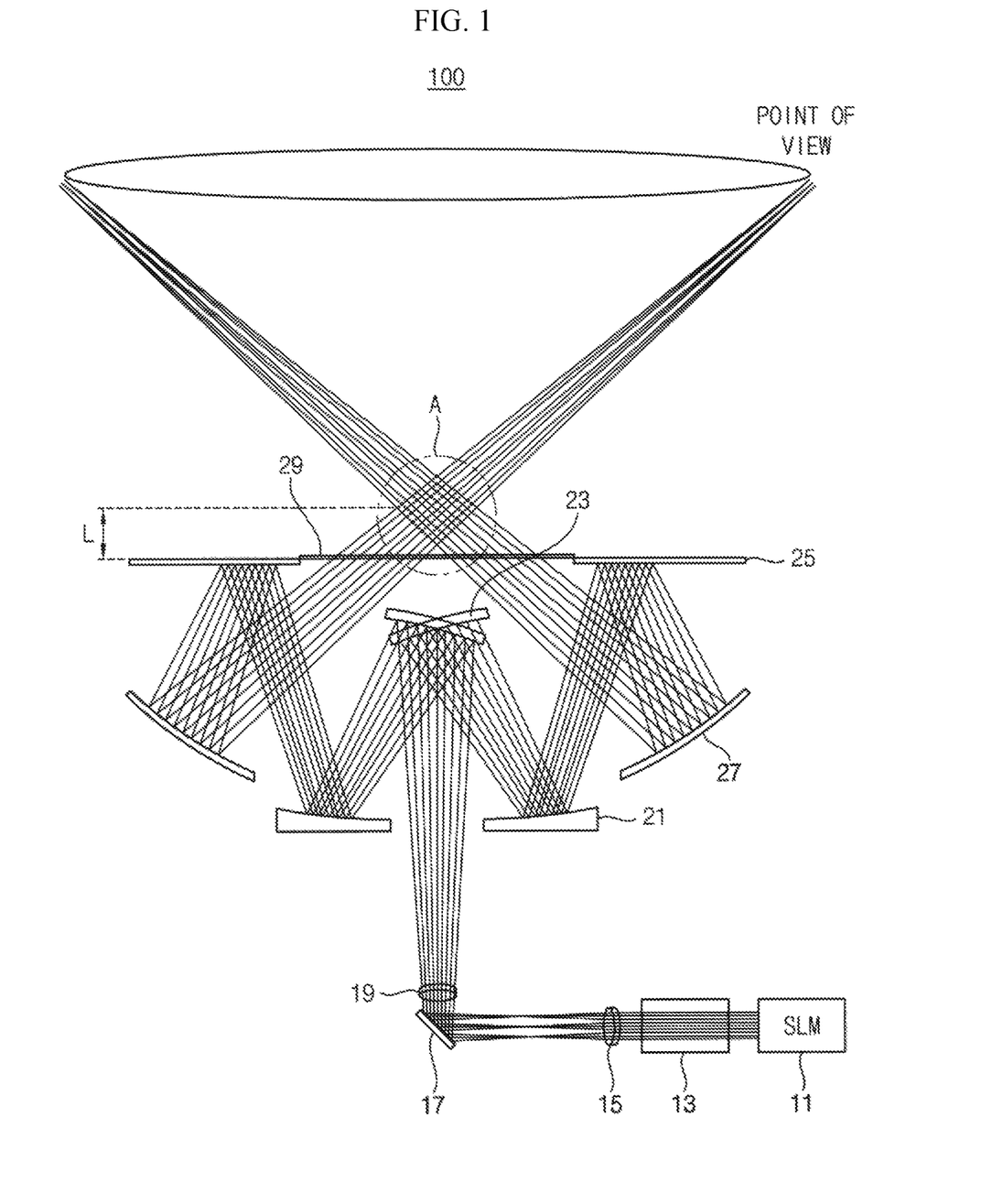
FIG. 1 illustrates a schematic configuration of an optical system for displaying a three dimensional image in accordance with example embodiments of the invention.

FIG. 1 illustrates a schematic configuration of an optical system for displaying a three dimensional image in accordance with example embodiments of the invention.

Referring to FIG. 1, an optical system for displaying a three dimensional image (hereinafter, referred to as 'optical system') 100 according to example embodiments may magnify a hologram and may display the hologram as a three dimensional image in a desired space. The optical system may include, based on a path of a light, a spatial light modulator (SLM) 11, a color composite prism 13, a focusing lens 15, a changing mirror 17, a relay lens 19, a rotating mirror 23, a tilted mirror 21, a planar mirror 25, a concave mirror 27 and a planar window 29.

The spatial light modulator 11 may receive a light and may modulate the light as the three dimensional image substantially corresponding to the hologram.

The color composite prism 13 may be configured to composite R, G and B colors. The color composite prism 13 may display the three dimensional image as a color image by synthesizing the R, G and B colors with the light passing through the spatial light modulator 11. Examples of the color composite prism 13 may include a total internal reflection (TIR) prism.

The focusing lens 15 may focus the light after the light passes through the spatial light modulator 11, or the spatial light modulator 11 and the color composite prism 13. Particularly, the focusing lens 15 may be a lens having a focal length of about 128 mm based on a wavelength band of green color. The focusing lens 15 may have a doublet structure in which a concave lens may be combined with a convex lens.

In the optical system 100 according to example embodiments, the spatial light modulator 11, the color composite prism 13 and the focusing lens 15 may be arranged in the order in which they are disposed in a line where the light passes through them. This line may be substantially perpendicular to a direction where the rotating mirror 23 is arranged.

The optical system 100 according to example embodiments may have the configuration in which the spatial light modulator 11, the color composite prism 13 and the focusing lens 15 may be substantially perpendicular to the rotating mirror 23.

As described above, the optical system 100 according to example embodiments may include the spatial light modulator 11, the color composite prism 13 and the focusing lens 15 arranged substantially perpendicular to the rotating mirror 23 such that the total height of the optical system 100 may be reduced. That is, when the optical system 100 has the configuration in which the spatial light modulator 11, the color composite prism 13 and the focusing lens 15 may be substantially perpendicular to the rotating mirror 23, the optical system 100 may ensure a height substantially lower than the height of the optical system having the configuration in which the spatial light modulator 11, the color composite prism 13, the focusing lens 15 and the rotating mirror 15 are arranged in a line.

In other words, the optical system 100 may have the configuration in which the spatial light modulator 11 such that the color composite prism 13 and the focusing lens 15 may be horizontally arranged based on the ground, the optical system 100 may have the height sufficiently lower than the height of the optical system having the configuration in which the spatial light modulator 11, the color composite prism 13 and the focusing lens 15 are vertically arranged based on the ground.

In the optical system 100 according to example embodiments, the path of the light must be changed toward a vertical direction after the light passes through the spatial light modulator 11, the color composite prism 13 and the focusing lens 15 successively arranged in the line configuration.

To this end, the optical system 100 may include the changing mirror 17 for changing the path of the light from a horizontal direction to the vertical direction, which may be disposed among the rotating mirror 23, the spatial light modulator 11, the color composite prism 13 and the focusing lens 15.

The changing mirror 17 may be disposed between the focusing lens 15 and the rotating mirror 23 with an angle of about 45 degree such that the changing mirror 17 the changing mirror 17 may change the path of the light passing through the focusing lens 15 toward the rotating mirror 23 vertically upwardly positioned over the changing mirror 17.

As such, according to example embodiments, the optical system 100 may include the changing mirror 17 to thereby reduce the total height of the optical system 100. Accordingly, a common user sitting on a chair or the ground may observe the hologram magnified and displayed in the three dimensional space by the optical system 100 because the optical system 100 may have the reduced entire height by the changing mirror 17.

The relay lens 19 may be configured to focus the light of which path is changed by the changing mirror 17. Thus, the relay lens 19 may be disposed between the changing mirror 17 and the rotating mirror 23. The relay lens 19 may be a lens having a focal length of about 360 mm based on the wavelength band of green color. Additionally, the relay lens 19 may have a doublet structure in which a concave lens may be combined with a convex lens.

Figure 2:
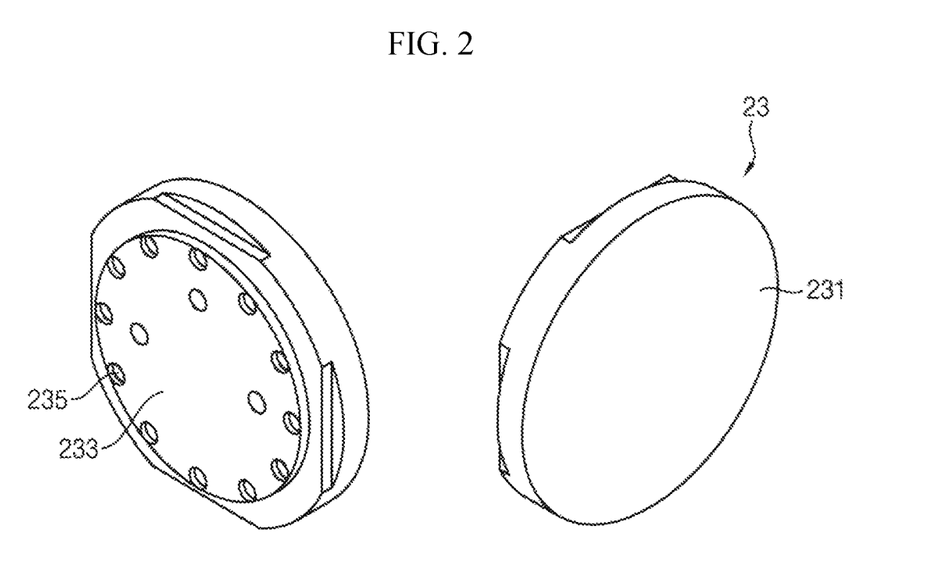
FIG. 2 illustrates a rotating mirror of the optical system for displaying a three dimensional image illustrated in FIG. 1.

FIG. 2 illustrates the rotating mirror of the optical system for displaying a three dimensional image illustrated in FIG. 1.

Referring to FIG. 2, the rotating mirror 23 may be disposed upwardly in the vertical direction over the spatial light modulator 11, the color composite prism 13 and the focusing lens 15 as described above.

The rotating mirror 23 may have a structure which may rotate by the connection with a rotatable member. Thus, the rotating mirror 23 may a super multi-view because the rotating mirror 23 may rotate in the optical system 100.

The rotating mirror 23 may have an X-axis and a Y-axis. The curvature radius of the X-axis may be different from the curvature radius of the Y-axis. The lights having substantially different paths may be concentrated at a point when the rotating mirror 23 may have the X-axis and the Y-axis of which curvature radii are different. Therefore, the optical aberrations of the optical system 100 may be reduced or corrected. For example, in the optical system 100, astigmatism may be reduced and distortion may be corrected by the rotating mirror 23.

The optical system 100 according to example embodiments may display apparently the three dimensional image in the desired space by the rotating mirror 23 having the X-axis and the Y-axis of which curvature radii are different.

In particular, the optical system 100 according to example embodiments may include the rotating mirror 23 which may rotate at a high speed, may change the path of the light incident from the relay lens 19 and may operate together with the tilted mirror 21, the planar mirror 25 and the concave mirror 27. Therefore, the user can observe the hologram magnified and displayed in the three dimensional space by the optical system 100 with a viewing angle of about 360 degree.

The rotating mirror 23 may be made from a light material having workability such as aluminum.

The rotating mirror 23 may have a rotational symmetrical structure which can be relatively easily prepared. Further, the rotating mirror 23 may have a free aspherical surface with the X-axis and the Y-axis of which curvature radii are different.

The rotating mirror 23 may have desired stability provided from the light material which may ensure the rotation thereof.

Additionally, the rotating mirror 23 may include one surface 231 on which the light enters and the other surface 233 opposed to the one surface 231. The other surface 233 of the rotating mirror 23 may have grooves 235. When the rotating mirror 23 includes the other surface 233 having the grooves 235, the rotating mirror 23 may have a reduced weight by the grooves 235 such that the optical system 100 may have a reduced total weight.

Moreover, the rotating mirror 23 may have a diameter less than about 100 mm such that the rotating mirror 23 may have a size relatively smaller than those of the tilted mirror 21, the planar mirror 25 and the concave mirror 27. Therefore, the damages to the elements of the optical system 100 caused by the rotation of the rotating mirror 23 may be minimized in the operation of the optical system 100.

Figure 3:
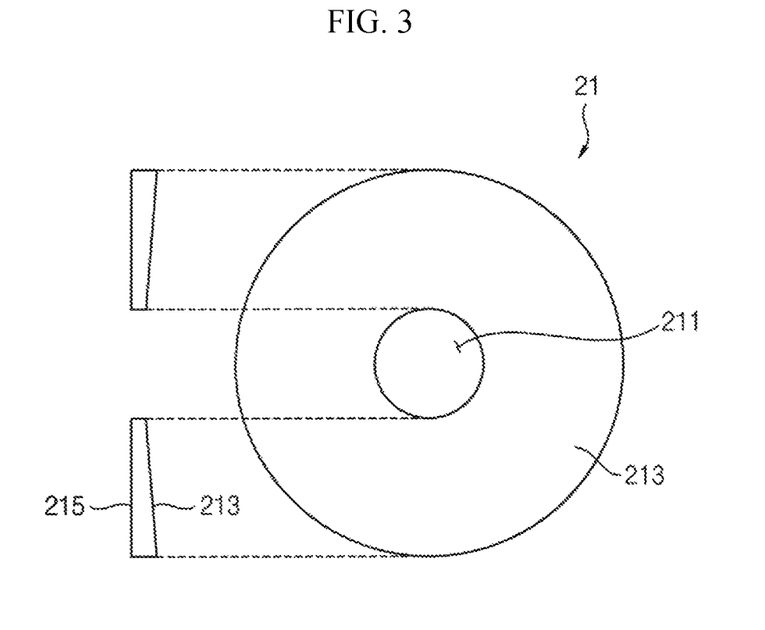
FIG. 3 illustrates a tilted mirror of the optical system for displaying a three dimensional image illustrated in FIG. 1.

FIG. 3 illustrates the tilted mirror of the optical system for displaying a three dimensional image illustrated in FIG. 1.

Referring to FIG. 3, the tilted mirror 21 may include a central region having a hole 211 for allowing the light to pass therethrough, and a peripheral region having one surface of a substantially concave tilted structure and the other surface of a substantially planar structure. The tilted mirror 21 may be disposed between the rotating mirror 21 and the planar mirror 25 such that the tilted mirror 21 may direct the light reflected from the rotating mirror 23 toward the planar mirror 25.

In the optical system 100 according to example embodiments, the tilted mirror 21 may have a diameter of about 350 mm. The hole 211 of the central region may have a diameter of about 100 mm and the tilted structure of the peripheral region may have a curvature radius of about 1,200 mm.

The light incident onto the rotating mirror 23 from the relay mirror 19 may pass through the hole 211 of the central region of the tilted mirror 21, and then the light reflected from the rotating mirror 23 may be directed toward the planar mirror 25 by the concave tilted structure of the one surface 214 of the tilted mirror 21.

Particularly, the tilted mirror 21 may limit the increase in the size of the concave mirror 27 since the tilted mirror 21 may limit the path of the light reflected from the planar mirror 25 to the concave mirror 27, and may form a focus between the tilted mirror 21 and the planar mirror 25 by adjusting the path of the light incident from a focus of the focusing lens 15 together with the relay lens 19, and rotating mirror 23 and the planar mirror 25.

Figure 4:
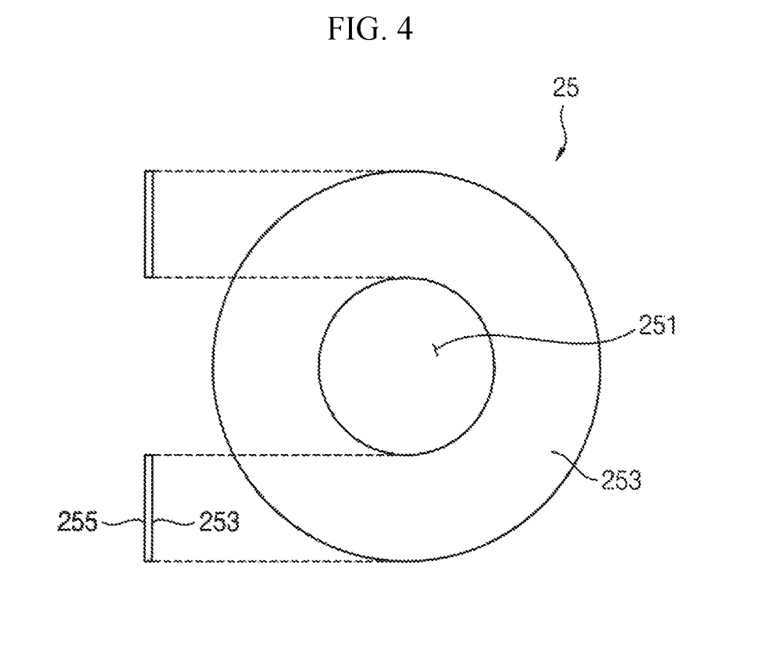
FIG. 4 illustrates a planar mirror of the optical system for displaying a three dimensional image illustrated in FIG. 1.

FIG. 4 illustrates the planar mirror of the optical system for displaying a three dimensional image illustrated in FIG. 1.

Referring to FIG. 4, the planar mirror 25 may include a central region having a hole 251 formed therein and a peripheral region of a substantially flat doughnut structure. For example, the planar mirror 25 may have the configuration in which the hole 251 is provided at the central region and the peripheral region has the substantially flat doughnut structure.

In the optical system 100 according to example embodiments, the planar mirror 25 may have a diameter of about 670 mm and the hole 251 of the central region may have a diameter of about 300 mm.

The planar mirror 25 may be disposed at a top of the optical system 100 according to example embodiments such that the planar mirror 25 may direct the light reflected from the tilted mirror 21 toward the concave mirror 27, and may allow the light directing toward the concave mirror 27 to pass through the hole 251 of the planar mirror 25.

The planar mirror 25 may focus the light together with the concave mirror 27 in front of the eye of the user while the planar mirror 25 directs the light reflected from the tilted mirror 21 toward the concave mirror 27.

In the optical system 100 according to example embodiments, the light reflected by the concave mirror 27 may passing through the hole 251 of the planar mirror 25 and may direct in front of the eye of the user the planar mirror 25 such that the magnified hologram may be displayed in the space A having a height L of about 100 mm over the planar mirror 25.

The optical system 100 may includes a planar window 29 in the hole 251 of the central region of the planar mirror 25 so as to protect the rotating mirror 23.

The planar mirror 25 may have one surface 253 on which the planar window 29 is positioned and the other surface 255 substantially facing the concave mirror 27.

Figure 5:
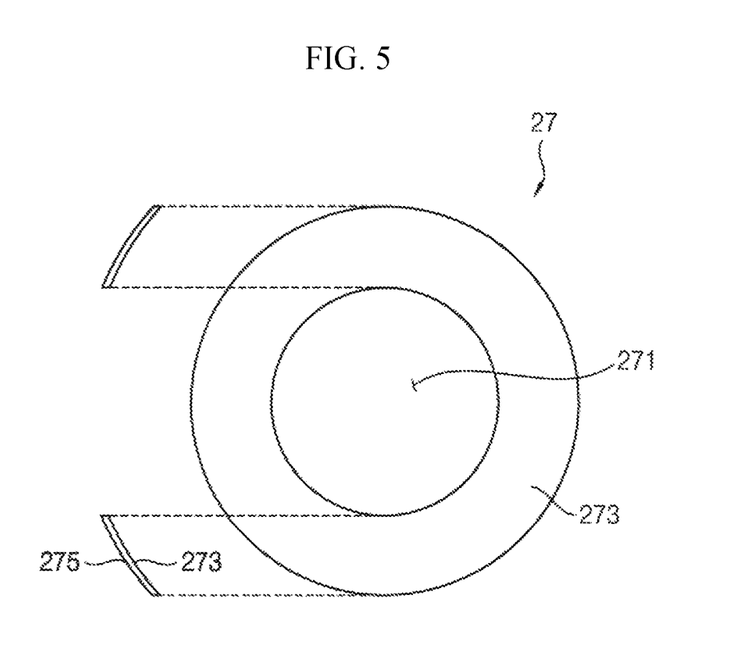
FIG. 5 illustrates a concave mirror of the optical system for displaying a three dimensional image illustrated in FIG. 1.

FIG. 5 illustrates the concave mirror of the optical system for displaying a three dimensional image illustrated in FIG. 1.

Referring to FIG. 5, the concave mirror 27 may include a central region having a hole 271 of which size may encompass the tilted mirror 21 and a peripheral region having an entirely concaved bending structure.

The concave mirror 27 may be disposed between the tilted mirror 21 and the planar mirror 25 such that the light reflected from the tilted mirror 21 to the peripheral region of the planar mirror 25 may pass through the hole 251 of the central region of the planar mirror 25.

Particularly, the concave mirror 27 may be positioned over the tilted mirror 21 to substantially enclose the tilted mirror 21. The concave mirror 27 may include a central region having a hole 271 substantially enclosing the tilted mirror 21 so that the path of the light reflected from the rotating mirror 23 and the tilted mirror 21 may be affected by the concave mirror 27.

In example embodiments, the concave mirror 27 may have a diameter of about 670 mm and the hole 271 of the central region thereof may have a diameter of about 400 mm.

When the concave mirror 27 has the diameter of about 670 mm, the diameter of the concave mirror 27 may be substantially the same as the diameter of the planar mirror 25 such that the concave mirror 27 may be readily arranged with respect to the planar mirror 25. If the hole 271 of the central region may have the diameter of about 400 mm, the concave mirror 27 may sufficiently enclose the tilted mirror 21 having the diameter of about 350 mm without changing the path of the light proceeding between the rotating mirror 23 and the tilted mirror 21.

The concave mirror 27 may have a curvature radius between about 470 mm and about 550 mm such that the light reflected from the planar mirror 25 may reach in front of the eye of the user and the hologram may be displayed in the three dimensional space A having the height of about 100 mm over the planar mirror 25. In other words, the concave mirror 27 may include one surface 273 substantially facing the planar mirror 25 wherein the one surface 273 may have a curvature radius between about 470 mm and about 550.

Additionally, the concave mirror 27 may include the other surface 275 having a curvature radius between about 480 mm and about 510 mm to thereby reduce the weight of the concave mirror 27.

The concave mirror 27 may adjust the light reaching the eye of the user such that the incident angle of the light reflected from the planar mirror 25 may be in a range between about 35 degree and about 50 degree. To this end, the concave mirror 27 may include a concave portion facing the planar mirror 25 wherein the concave portion may be inclined an angle range between about 35 degree and about 50 degree relative to the other surface 215 of the tilted mirror 21. If the concave mirror 27 deviates from the angle range between about 35 degree and about 50 degree, the optical system 100 may not display a desired apparent image.

Further, the concave mirror 27 may be spaced apart from the planar mirror 25 by a distance of about 300 mm such that the light may not collide with the rotating mirror 23 and the planar mirror 25.

The planar window 29 may be configured to substantially cover the hole 251 of the central region of the planar mirror 25. Since the planar window 29 may substantially cover the central region of the planar mirror 25, the planar window 29 may have a diameter substantially larger than the diameter of the hole 251 of the central region of the planar mirror 25. For example, the planar window 29 may have a diameter of about 310 mm.

If the planar window 29 covers the central region of the other surface 255 of the planar mirror 25, the planar window 29 may have a relatively complicate structure and thus the planar window 29 may substantially cover the central region of the one surface 253 of the planar mirror 25 only.

The light reflected from the concave mirror 27 passes through the planar window 29 so that the planar window 29 may include a material for readily passing the light therethrough.

Anti-reflecting coatings (not illustrated) may be provided on both surfaces of the planar window 29 to minimize the transmissivity of the light passing through the planar window 29 as well as the ghost phenomenon caused by the double reflection of the light on the planar window 29.

The optical system 100 according to example embodiments may include the planar window 29 having the above configuration so that the rotating mirror 23 rotating at the high speed may be effectively protected and also the damage to the carless user may be prevented.

As described above, the optical system 100 according to example embodiments may include the rotating mirror 23, the tilted mirror 21, the planar mirror 25 and the concave mirror 27 such that the chromatic aberrations may not be generated among these elements to thereby display the three dimensional image with a reality.

The optical system 100 according to example embodiments may include a plurality of mirrors having large sizes which cannot accomplished using lenses so that the optical system 100 may efficiently display the magnified hologram in the desired space as the three dimensional image.

The optical system 100 according to example embodiments may include the rotating mirror 23 having the diameter relatively smaller than those of the tilted mirror 21, the planar mirror 25 and the concave mirror 27 such that the damage to the rotating mirror 23 may be effectively minimized in the operation of the optical system 100.

The optical system 100 according to example embodiments may include the spatial light modulator 11, the color composite prism 13 and the focusing lens 15 arranged horizontally in the line configuration so that the optical system 100 may have a compact structure by reducing the total height of the optical system 100.

Hereinafter, the path of the light in the optical system according to example embodiments will be described.

The optical system 100 illustrated in FIG. 1 may have the configurations in which the spatial light modulator 11, the color composite prism 13 and the focusing lens 15 are successively arranged in the line and in which the relay lens 19, the tilted mirror 21, the concave mirror 27, the rotating mirror 23, the planar mirror 25 and the planar window 29 are arranged over the changing mirror 17.

To display the three dimensional image, the path of the light passing through the focusing lens 15 may be changed from the horizontal direction to the vertical direction by the changing mirror 17. After the path of the light is changed along the vertical direction, the light may pass through the relay lens 19 and may proceed onto the one surface 231 of the rotating mirror 23.

The light entering the one surface of the rotating mirror 23 may be reflected toward the one surface 213 of the tilted mirror 21 positioned under the rotating mirror 23, and then the light reflected from the one surface 213 of the tilted mirror 21 may direct onto the other surface 255 of the planar mirror 25.

The light reflected toward the other surface 255 of the planar mirror 25 may direct onto the one surface 273 of the concave mirror 27, and then the light reflected from the one surface 273 of the concave mirror 27 may pass through the planar window 29 provided at the central region of the planar mirror 25.

As described above, in the optical system 100 according to example embodiments, the light may be reflected at the angle of about 360 degree by the rotation of the rotating mirror 23 and may pass through the tilted mirror 21, the planar mirror 25, the concave mirror 27 and the planar window 29. Accordingly, the hologram may be displayed over the planar mirror 25 by the distance of about 100 mm such that the user may observe the hologram as the three dimensional image.

The optical system for displaying a three dimensional image according to example embodiments may be used in various applications such as the exhibition, the exposition, etc. Additionally, the optical system for displaying a three dimensional image may be utilized to display the desired image with reality for education, advertisement, etc.

The optical system for displaying a three dimensional image according to example embodiments may be employed in various display apparatuses for displaying an image.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

| [REFERENCE NUMERIALS] | |
|---|---|
| 11: spatial light modulator | 13: color composite prism |
| 15: focusing lens | 17: changing mirror |
| 19: relay lens | 21: tilted mirror |
| 23: rotating mirror | 25: planar mirror |
| 27: concave mirror | 29: planar window |
| 100: optical system | |

What is claimed is:

1. An optical system for displaying a three dimensional image comprising:
 a changing mirror configured to change a path of a light from a horizontal direction to a vertical direction after the light passes through a spatial light modulator;
 a rotating mirror configured to rotate with an X-axis and a Y-axis having different curvature radii;
 a tilted mirror comprising a central region including a hole for allowing the light to pass therethrough, and a peripheral region including one surface having a concave tilted structure and the other surface having a planar structure;
 a concave mirror comprising a central region including a hole having a size capable of encompassing the tilted mirror, and a peripheral region having an entirely concaved bending structure; and
 a planar mirror comprising a central region including a hole therein, and a peripheral region having a flat doughnut structure,
 wherein the changing mirror, the tilted mirror, the rotating mirror and the planar mirror are arranged such that the light of which path is changed by the changing mirror passes through the central region of the tilted mirror, the light directs onto the rotating mirror, the light is reflected toward the one surface of the peripheral region of the tilted mirror, the light is reflected toward the peripheral region of the planar mirror, the light is reflected onto the concave mirror, and the light passes through the central region of the planar mirror, and
wherein the concave mirror encloses the tilted mirror under the rotating mirror.

2. The optical system for displaying a three dimensional image of claim 1, wherein the rotating mirror includes aluminum and one surface of the rotating mirror onto which the light is not incident has a concave structure.

3. The optical system for displaying a three dimensional image of claim 2, wherein the concave mirror includes a concave portion facing the planar mirror and having an angle of about 35 degree to about 50 degree with respect to the other surface of the tilted mirror.

4. The optical system for displaying a three dimensional image of claim 1, further comprising a color composite prism configured to synthesize R, G and B colors with the light passing through the spatial light modulator, and a focusing lens focusing the light after the light passes through the spatial light modulator,
wherein the spatial light modulator, the color composite prism and the focusing lens are arranged in a line as well as perpendicular to a direction where the rotating mirror is arranged.

5. The optical system for displaying a three dimensional image of claim 1, further comprising a relay lens configured to focus the light of which path is changed by the changing mirror before the light passes through the central region of the tilted mirror.

6. The optical system for displaying a three dimensional image of claim 1, further comprising a planar window configured to cover the hole of the central region of the planar mirror wherein the planar window includes anti-reflective coatings on both surfaces thereof.

* * * * *